US008825382B2

(12) United States Patent
Liu

(10) Patent No.: US 8,825,382 B2
(45) Date of Patent: Sep. 2, 2014

(54) NAVIGATION SYSTEM WITH MULTIMEDIA DISTRIBUTION MECHANISM AND METHOD OF OPERATION THEREOF

(75) Inventor: Winston Yonglong Liu, San Jose, CA (US)

(73) Assignee: Telenav, Inc., Sunnyvale, CA (US)

( * ) Notice: Subject to any disclaimer, the term of this patent is extended or adjusted under 35 U.S.C. 154(b) by 437 days.

(21) Appl. No.: 13/032,535

(22) Filed: Feb. 22, 2011

(65) Prior Publication Data

US 2012/0215440 A1    Aug. 23, 2012

(51) Int. Cl.
G01C 21/34    (2006.01)
G01C 21/36    (2006.01)
G06Q 30/00    (2012.01)
G06Q 30/02    (2012.01)

(52) U.S. Cl.
CPC ........ *G01C 21/3679* (2013.01); *G01C 21/3682* (2013.01); *G06Q 30/00* (2013.01); *G06Q 30/0273* (2013.01); *G06Q 30/0252* (2013.01)
USPC ........... 701/426; 701/438; 701/425; 701/439

(58) Field of Classification Search
CPC .......... G01C 21/3679; G01C 21/3682; G06Q 30/00; G06Q 30/0273; G06Q 30/0252; G06Q 30/02; G06F 17/30047; H04W 4/02

USPC ......... 701/426, 438, 439; 705/36 R, 35, 27.2, 705/26.62, 14.39, 26.1; 707/999.104, 707/999.107, E17.01
See application file for complete search history.

(56) References Cited

U.S. PATENT DOCUMENTS

| | | | |
|---|---|---|---|
| 6,947,976 B1* | 9/2005 | Devitt et al. .................. | 709/219 |
| 7,546,254 B2 | 6/2009 | Bednarek | |
| 2009/0094257 A1 | 4/2009 | Nissen | |
| 2009/0157658 A1 | 6/2009 | Bonev et al. | |
| 2009/0158186 A1 | 6/2009 | Bonev et al. | |
| 2009/0276318 A1* | 11/2009 | Broadbent et al. ......... | 705/14.64 |
| 2011/0307478 A1* | 12/2011 | Pinckney et al. ............. | 707/724 |
| 2012/0089996 A1* | 4/2012 | Ramer et al. .................... | 725/14 |
| 2012/0231817 A1* | 9/2012 | Holm et al. ................ | 455/456.3 |

FOREIGN PATENT DOCUMENTS

WO    WO 00/41090 A1    7/2000

* cited by examiner

Primary Examiner — Marthe Marc-Coleman
(74) Attorney, Agent, or Firm — IP Investment Law Group

(57) ABSTRACT

A method of operation of a navigation system includes: generating a navigation route; generating an initial recommendation related to a search keyword for a point of interest upcoming along the navigation route; calculating an acquisition cost for the initial recommendation; and generating a message with the acquisition cost for the initial recommendation related to the point of interest and for displaying on a device.

20 Claims, 6 Drawing Sheets

NAVIGATION SYSTEM WITH MULTIMEDIA DISTRIBUTION MECHANISM AND METHOD OF OPERATION THEREOF

TECHNICAL FIELD

The present invention relates generally to a navigation system, and more particularly to a system for a navigation system with multimedia.

BACKGROUND ART

Modern portable consumer electronics, especially client devices, such as global position systems, cellular phones, and portable digital assistants, are providing increasing levels of functionality to support modern life including location-based information services. Numerous technologies have been developed to utilize this new functionality. Some of the research and development strategies focus on new technologies while others focus on improving existing and mature technologies. Research and development in the existing and mature technologies may take a myriad of different directions.

As consumers become more empowered with a growth of mobile location-based service devices, new and old marketing paradigms begin to take advantages of this new device space. There are many technological solutions to take advantage of this new device location opportunity. One possible approach can be to provide location sensitive marketing messages that allow businesses to promote products. However, the ability for the businesses to promote the products on the mobile devices having location-based services does not automatically translate to being an effective marketing campaign.

Thus, a need still remains for a navigation system with multimedia distribution mechanism for providing an effective marketing campaign. In view of ever-increasing added features desired by consumers in their mobile devices, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: generating a navigation route; generating an initial recommendation related to a search keyword for a point of interest upcoming along the navigation route; calculating an acquisition cost for the initial recommendation; and generating a message with the acquisition cost for the initial recommendation related to the point of interest and for displaying on a device.

The present invention provides a navigation system, including: a plan module for generating a navigation route; an assess recommendation module, coupled to the plan module, for generating an initial recommendation related to a search keyword for a point of interest upcoming along the navigation route; an adjust cost module, coupled to the assess recommendation module, for calculating an acquisition cost for the initial recommendation; and a generate message module, coupled to the adjust cost module, for generating a message with the acquisition cost for the initial recommendation related to the point of interest and for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
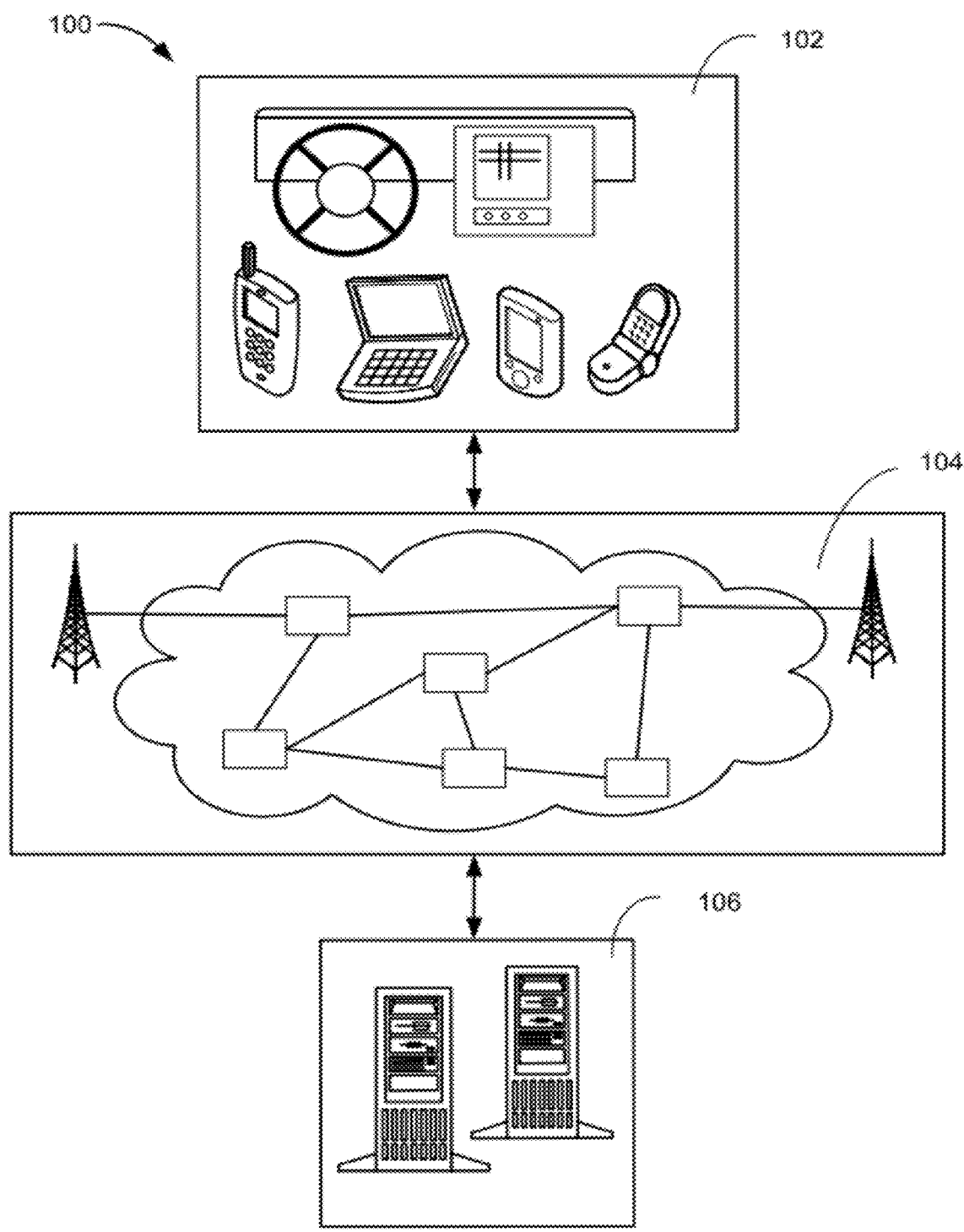
FIG. 1 is a navigation system with multimedia distribution mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with multimedia distribution mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
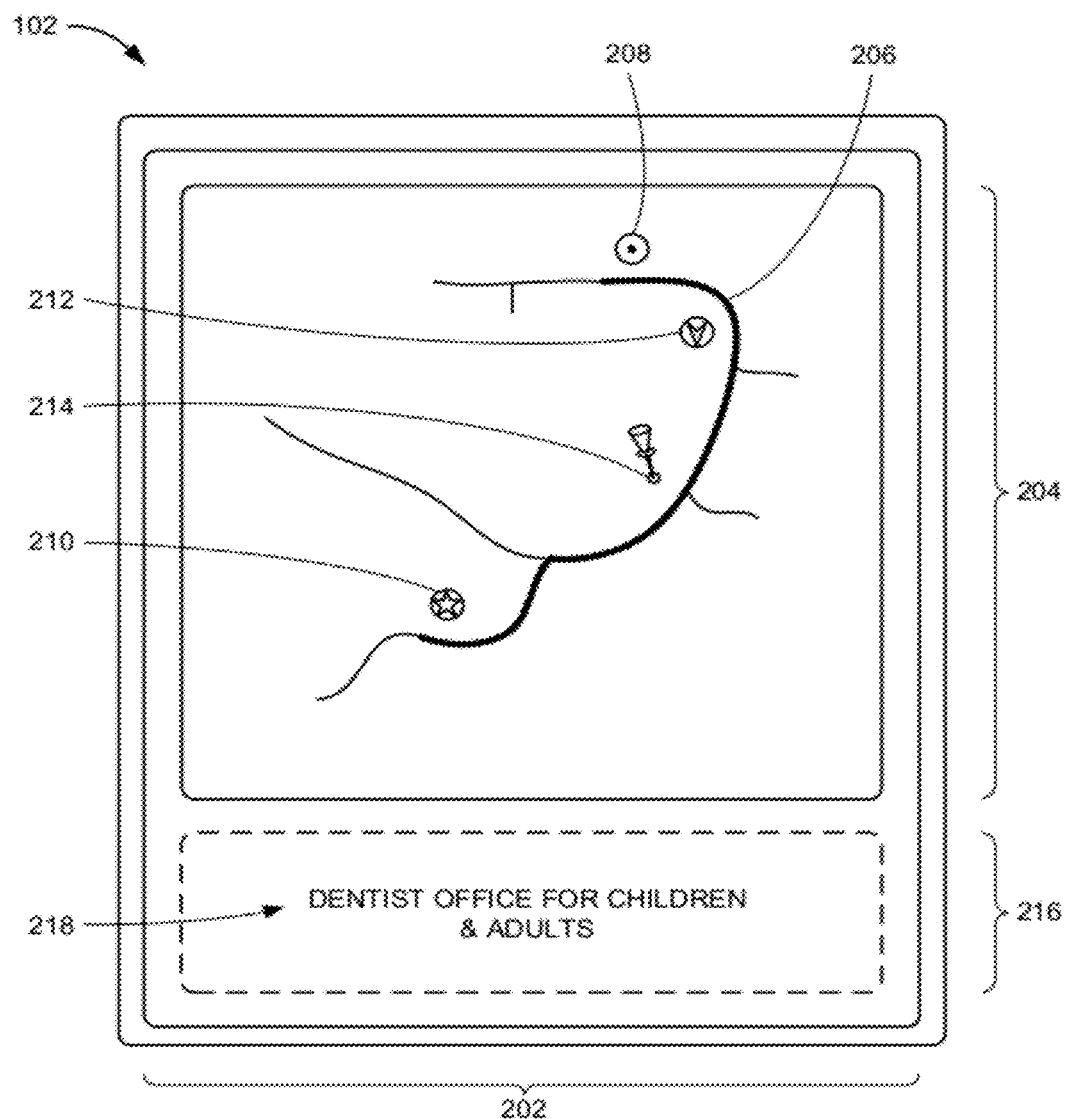
FIG. 2 is an example of a display on a display interface of the first device.

Referring now to FIG. 2, therein is shown an example of a display on a display interface 202 of the first device 102. The display is defined as a visual presentation of navigation information. For example, the navigation information can be a map, a street name, a turn-by-turn instruction, or any relevant information for navigation purposes.

The display interface 202 is defined as an electronic device that presents the navigation information in a visual form, an audio form, or a combination thereof. The display interface 202 can include a display device, a projector, a video screen, a speaker, a microphone, or a combination thereof.

The display interface 202 can depict a navigation map 204, which is a visual presentation of an area. The navigation map 204 can depict a navigation route 206, which is defined as a path for travel from an origin 208 to a destination 210. The origin 208 is defined as a starting point as a location to be traveled from. The destination 210 is defined as an ending point as a location to be traveled to.

The navigation map 204 can depict a current location 212, which is defined as a present location of the first device 102. The current location 212 can be depicted along the navigation route 206.

The navigation map 204 can depict a point of interest 214, which is defined as a location that a user finds useful or interesting and to where the user would like to travel. The point of interest 214 can be a location upcoming along or near the navigation route 206. For example, the point of interest 214 can be a dental office or a wholesale store.

For example, the point of interest 214 can be an advertised location of a dental office or a sponsored entity. Also for example, the point of interest 214 can be a store or a business where a product can be purchased or a service can be paid for.

The display interface 202 can include a message window 216 to present a message 218 to a user. The message 218 presents multimedia information related to the point of interest 214. The message 218 can provide an effective marketing campaign that satisfies or meets an objective of the entity that pays for the advertisement. The message 218 can provide the entity a more effective way to promote their products or brand names.

For example, the message 218 is shown as "Dentist Office for Children & Adults". Also for example, the product or the service offered at the point of interest 214 can be advertised by the message 218.

The message 218 can be displayed, pronounced, or a combination thereof. For illustrative purposes, the message 218 is shown as text, although the message 218 can be presented in a different manner. For example, the message 218 can be presented with audio, text, images, video, animation, or interactivity.

For example, the message 218 can include media or contents of an advertisement (ad). Also for example, the message 218 can include a sponsored greeting, a multimedia ad, or a multimedia greeting. Further, for example, the message 218 can be sponsored by an entity, such as a company, a business, an organization, or a group that pays for the advertisement or a marketing campaign.

Figure 3:
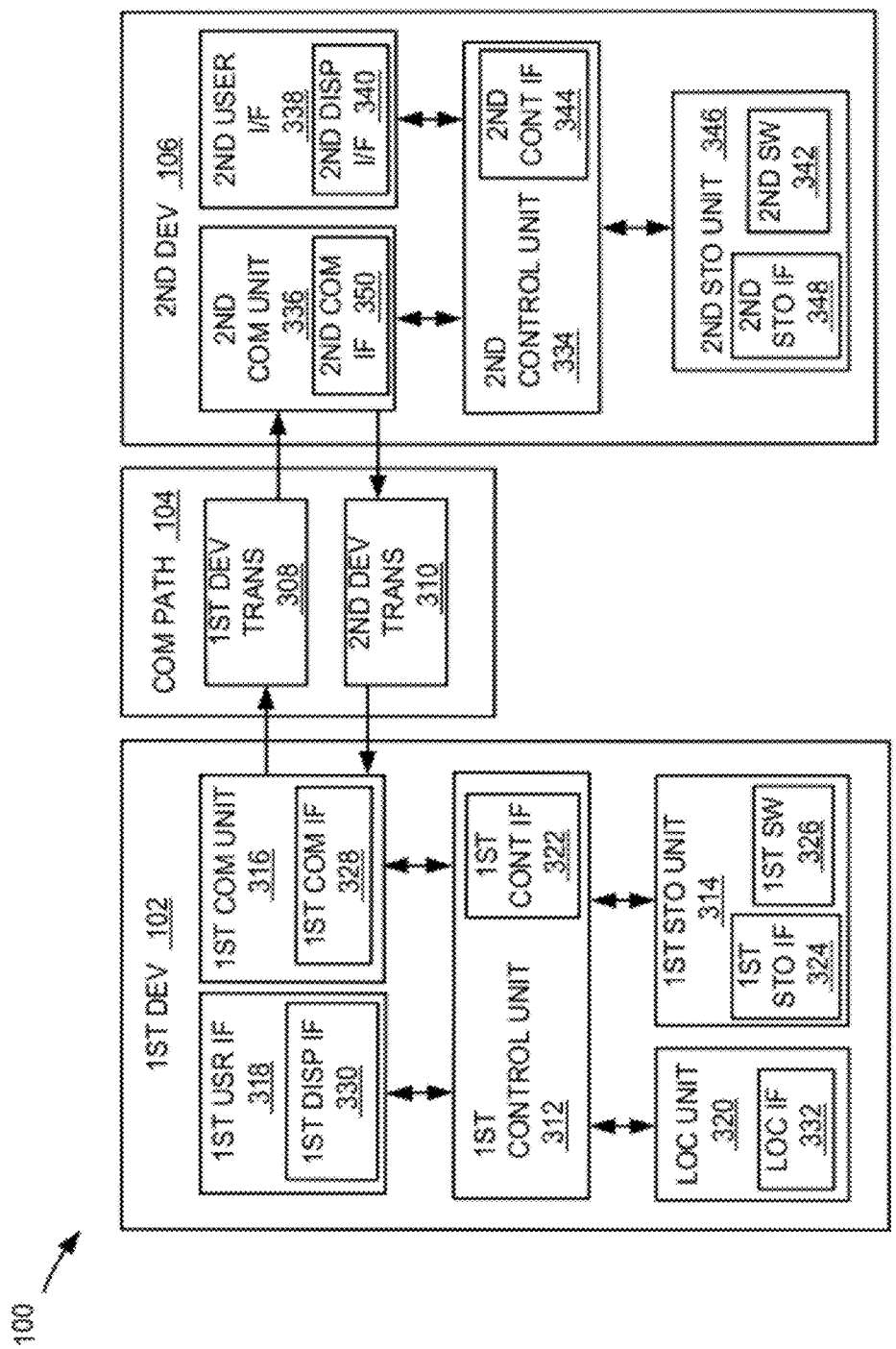
FIG. 3 is an exemplary block diagram of the navigation system.

Referring now to FIG. 3, therein is shown an exemplary block diagram of the navigation system 100. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, a first user interface 318, and a location unit 320. The first control unit 312 can include a first control interface 322. The first control unit 312 can execute a first software 326 to provide the intelligence of the navigation system 100.

The first control unit 312 can be implemented in a number of different manners. For example, the first control unit 312 can be a processor, an embedded processor, a microprocessor, a hardware control logic, a hardware finite state machine (FSM), a digital signal processor (DSP), or a combination thereof.

The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial navigation system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations external to the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information, such as advertisements, points of interest (POI), navigation routing entries, or any combination thereof.

The first storage unit 314 can be a volatile memory, a nonvolatile memory, an internal memory, an external memory, or a combination thereof. For example, the first storage unit 314 can be a nonvolatile storage such as nonvolatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, or any combination thereof to provide data and communication inputs.

The first user interface 318 can include a first display interface 330. The first display interface 330 can include a display, a projector, a video screen, a speaker, or any combination thereof. The first display interface 330 can be represented by the display interface 202 of FIG. 2.

The first control unit 312 can operate the first user interface 318 to display information generated by the navigation system 100. The first control unit 312 can also execute the first software 326 for the other functions of the navigation system 100, including receiving location information from the location unit 320. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second control interface 344 can also be used for communication that is external to the second device 106.

The second control interface 344 can receive information from the other functional units or from external sources, or can transmit information to the other functional units or to external destinations. The external sources and the external destinations refer to sources and destinations external to the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest (POI), navigation routing entries, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as nonvolatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 320, although it is understood that the second device 106 can also operate the location unit 320.

Figure 4:
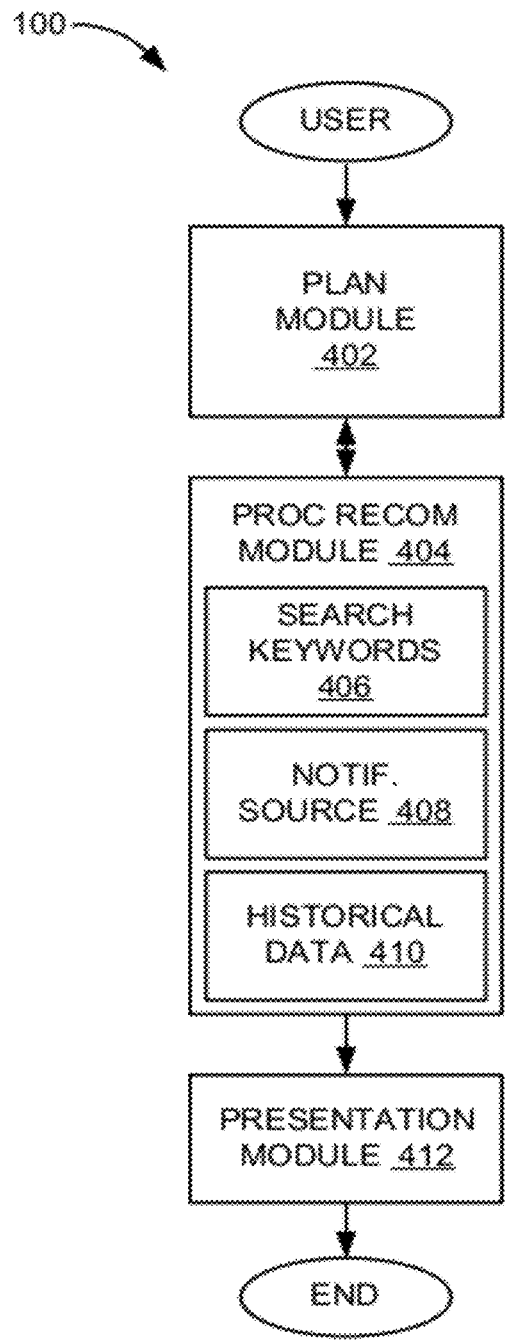
FIG. 4 is a control flow of the navigation system.

Referring now to FIG. 4, therein is shown a control flow of the navigation system 100. The navigation system 100 can be operated by a user. The navigation system 100 can include a plan module 402 providing an input mechanism for receiving the origin 208 of FIG. 2 or the destination 210 of FIG. 2 to create, plan, or generate the navigation route 206 of FIG. 2.

The destination 210 can be provided or received based on a predetermined favorite point or preference. The plan module 402 can calculate the current location 212 of FIG. 2 of a device, such as the first device 102 of FIG. 1 or the second device 106 of FIG. 1. The plan module 402 can determine or generate the point of interest 214 of FIG. 2, along or near the navigation route 206.

The plan module 402 can be implemented with the first device 102 of FIG. 1. For example, the plan module 402 can be implemented with the first control unit 312 of FIG. 3, the first user interface 318 of FIG. 3, the location unit 320 of FIG. 3, the first storage interface 324 of FIG. 3, the first software 326 of FIG. 3, or a combination thereof.

For a more specific example, the plan module 402 can generate the navigation route 206 with the first control unit 312, the location unit 320, the first storage interface 324, and the first software 326. Also for a more specific example, the plan module 402 can receive and store the origin 208 or the destination 210 with the first user interface 318.

The navigation system 100 can include a process recommendation module 404, which generates the message 218 of FIG. 2, related to the point of interest 214. The message 218 can be generated based on search keywords 406. The search keywords 406 are defined as a group of words that are associated with a search for information. The process recommendation module 404 can be coupled to the plan module 402.

The search keywords 406 can be associated with a subject inquired by the user. For example, the subject can preferably include a product, although the subject can include other inquiries, such as a business, a service, an event, a person, or any information that the user would like to find.

The plan module 402 can select an entry from a predetermined list to determine the point of interest 214. The plan module 402 can determine the point of interest 214 by selecting a location that is associated with the search keywords 406. For example, one of the search keywords 406 can be "grocery" and the point of interest 214 can be a supermarket.

The process recommendation module 404 can generate the message 218 based on a notification source 408, which is defined as information or contents of a notification that is associated with the point of interest 214. For example, the notification source 408 can be an advertisement source. Also for example, the process recommendation module 404 can receive the notification source 408 provided by or for an information supplier or an advertiser.

For a more specific example, the notification source 408 can be information provided for a presentation of an advertisement or a sponsored greeting. Also for a more specific example, the notification source 408 can be provided by or for an entity, which sponsors the advertisement or the sponsored greeting.

The process recommendation module 404 can generate the message 218 based on historical data 410, which are defined as past actions performed by the user. The process recommendation module 404 can generate the message 218 based on other selection features, which will be discussed later.

For example, the historical data 410 can include the user's past behaviors, previous purchases, or previous product searches performed by the user. Also for example, the historical data 410 can include types of purchased goods, frequently shopped stores, searched items, attended events, or doctors visited.

The process recommendation module 404 can be implemented with the first device 102 of FIG. 1, the communication path 104 of FIG. 1, the second device 106 of FIG. 1, or a combination thereof. For example, the process recommendation module 404 can be implemented with the first device transmission 308 of FIG. 3, the second device transmission 310 of FIG. 3, the first control unit 312 of FIG. 3, the first communication unit 316 of FIG. 3, the first storage interface 324 of FIG. 3, the first software 326 of FIG. 3, the second control unit 334 of FIG. 3, the second communication unit 336 of FIG. 3, the second software 342 of FIG. 3, the second storage interface 348 of FIG. 3, or a combination thereof.

For a more specific example, the process recommendation module 404 can generate the message 218 with the first control unit 312, the first storage interface 324, and the first software 326. Also for a more specific example, the process recommendation module 404 can receive and store the notification source 408 and the historical data 410 with the first storage interface 324, the second storage interface 348, or a combination thereof.

The navigation system 100 can include a presentation module 412 to present the message 218. The presentation module 412 can be coupled to the process recommendation module 404. The presentation module 412 can receive the message 218 from the process recommendation module 404.

The presentation module 412 can present the message 218 along the navigation route 206. The message 218 can be presented to a user who performs a search for the point of interest 214. The message 218 can be presented, played, displayed, pronounced, or a combination thereof on a device, such as the first device 102 of FIG. 1. For example, the message 218 can be presented along the navigation route 206 including at the beginning, the middle, or the end of the navigation route 206 providing a more value-added service.

The presentation module 412 can be implemented with the first device 102 of FIG. 1. For example, the presentation module 412 can be implemented with the first control unit 312 of FIG. 3, the first user interface 318 of FIG. 3, the first storage interface 324 of FIG. 3, the first software 326 of FIG. 3, or a combination thereof. For a more specific example, the presentation module 412 can present the message 218 with the first control unit 312, the first storage interface 324, and the first software 326.

Figure 5:
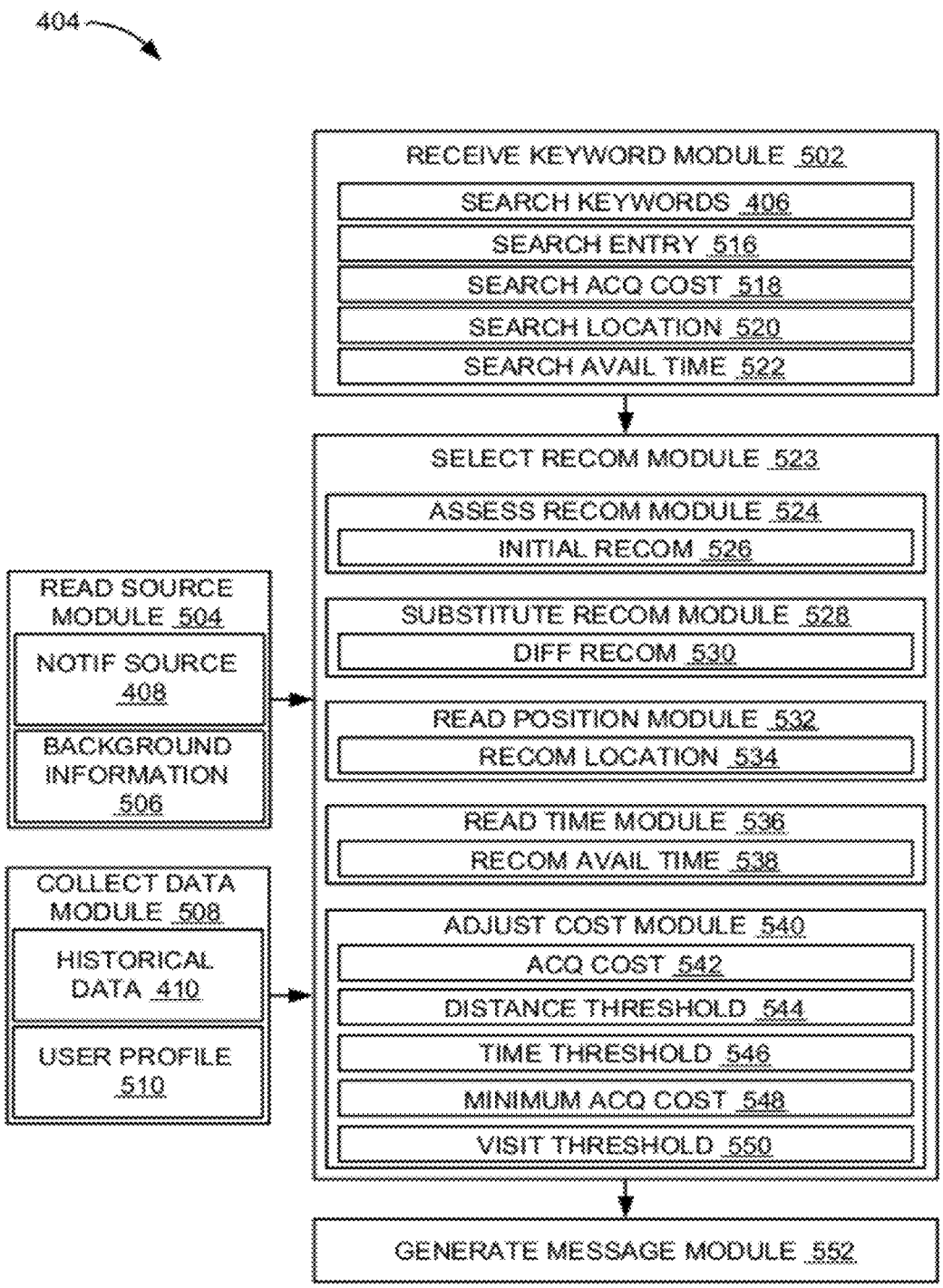
FIG. 5 is a control flow of the process recommendation module.

Referring now to FIG. 5, therein is shown a control flow of the process recommendation module 404. The process recommendation module 404 can include a receive keyword module 502, which receives search information from a search performed by the user and recognizes the search keywords 406.

The receive keyword module 502 can parse the search information from the search by dividing the search information into words. The receive keyword module 502 can recognize the search keywords 406 by comparing the words to a set of pre-defined words.

The search information from the search can be generated by a web browser or an application program that traverses, retrieves, and presents information resources. The receive keyword module 502 can intercept output data of the web browser or the application program for the search information for a product or service. For example, the receive keyword module 502 can intercept or recognize a search performed on a smart phone through a browser.

The receive keyword module 502 can intercept or receive search output data from the web browser or the application program. For example, the search output data can be received by the receive keyword module 502 while a search for a notebook is performed, and the receive keyword module 502 can recognize "notebook" as one of the search keywords 406. The receive keyword module 502 can obtain additional information from the search keywords 406 as described subsequently below.

The process recommendation module 404 can include a read source module 504, which reads the notification source 408 and background information 506. The notification source 408 can include a predetermined list or table of entries. The background information 506 is related to the point of interest 214 of FIG. 2. The background information 506 can be used to inform or educate the user information about the point of interest 214.

For example, the background information 506 can include information that is helpful to a user before he or she makes a decision to purchase a product, seeks for a service, or attends an event. Also for example, the background information 506 can include information related to specialties of a healthcare provider, types of equipments used at a clinic, types of insurances accepted, or lawsuits filed against a service provider. Further, for example, the notification source 408 can include information related to a sponsored entity including a company, a business, an organization, or a group that pays for the advertisement or a marketing campaign.

The read source module 504 can be implemented with the second device 106 of FIG. 1. For example, the read source module 504 can be implemented with the second control unit 334 of FIG. 3, the second software 342 of FIG. 3, the second storage interface 348 of FIG. 3, or a combination thereof.

For a more specific example, the read source module 504 can read the notification source 408 and the background information 506 with the second control unit 334 and the second software 342. Also for a more specific example, the notification source 408 and the background information 506 can be recorded or stored with the second storage interface 348.

The process recommendation module 404 can include a collect data module 508 providing the historical data 410 and a user profile 510. The user profile 510 includes information related to the user of the navigation system 100 who performs the search. The user profile 510 can include dietary requirements, which are restrictions that necessitate a regulated daily nutrition allowance.

The user profile 510 can be generated based on the user's medical history. For example, the user profile 510 can indicate that the user is diabetic and restrict the user from eating ice cream that is not sugar-free.

The collect data module 508 can be implemented with the second device 106 of FIG. 1. For example, the collect data module 508 can be implemented with the second control unit 334 of FIG. 3, the second software 342 of FIG. 3, the second storage interface 348 of FIG. 3, or a combination thereof.

For a more specific example, the collect data module 508 can provide the historical data 410 and the user profile 510 with the second control unit 334 and the second software 342. Also for a more specific example, the historical data 410 and the user profile 510 can be recorded or stored with the second storage interface 348.

The receive keyword module 502 can obtain or extract the additional information from the search keywords 406. The additional information can include a search entry 516, a search acquisition cost 518, a search location 520, and a search available time 522. The search entry 516 is defined as a feature that the user would like to find. The receive keyword module 502 can extract the search entry 516 by comparing the search keywords 406 to a pre-determined set of features in the notification source 408.

The receive keyword module 502 can compare the search entry 516 to each of the features in the notification source 408. The receive keyword module 502 can record the search entry 516 with one of the search keywords 406 that matches one of the features.

For example, the notification source 408 provides a pre-determined set of stationary products including a notebook. In this example, the receive keyword module 502 compares the search keywords 406 to the notification source 408 and determines that one of the search keywords 406 matches "notebook", the receive keyword module 502 records the search entry 516 as "notebook". Also for example, the search entry 516 can be a product available at a store or a service offered at an office.

The receive keyword module 502 can extract the search acquisition cost 518 from the search keywords 406. The search acquisition cost 518 is defined as an assigned number associated with the search entry 516. For example, the search acquisition cost 518 can be a price of the search entry 516, which can be a product or a service.

The receive keyword module 502 can extract the search location 520 and the search available time 522 from the search keywords 406. The search location 520 is a location where the search entry 516 can be found. The search available time 522 is a day of a calendar year when the search entry 516 can be found at the search location 520. For example, the search available time 522 can be a day when the search entry 516 is offered as an item for sales at the search location 520.

The search entry 516, the search acquisition cost 518, the search location 520, the search available time 522, or a combination thereof can be fixed at the time when the user performs the search. For example, the search acquisition cost 518 can be a fixed numerical value at the time when the user performs the search.

The receive keyword module 502 can be implemented with the first device 102 of FIG. 1. For example, the receive keyword module 502 can be implemented with the first control unit 312 of FIG. 3, the first user interface 318 of FIG. 3, the location unit 320 of FIG. 3, the first storage interface 324 of FIG. 3, the first software 326 of FIG. 3, or a combination thereof. For a more specific example, the receive keyword module 502 can extract the search entry 516, the search acquisition cost 518, the search location 520, and the search available time 522 with the first control unit 312, the first storage interface 324, and the first software 326.

The process recommendation module 404 can include a select recommendation module 523, which selects an entry from a predetermined list to determine the point of interest 214. The select recommendation module 523 can be coupled to the receive keyword module 502, the read source module 504, and the collect data module 508.

The select recommendation module 523 can determine the point of interest 214 by selecting a location that is associated with the search keywords 406. For example, one of the search keywords 406 can be "grocery" and the point of interest 214 can be a supermarket.

The select recommendation module 523 can include an assess recommendation module 524 to generate an initial recommendation 526 related to the search keywords 406 for the point of interest 214 upcoming along the navigation route 206. The initial recommendation 526 is defined as an item, an object, or a feature that the user would like to find. The initial recommendation 526 can be the same as the search entry 516 if the assess recommendation module 524 can determine that the search entry 516 can be located at the point of interest 214 along the navigation route 206 of FIG. 2. The initial recommendation 526 can be determined by selecting an entry from the notification source 408.

The assess recommendation module 524 can be implemented with the first device 102 of FIG. 1. For example, the assess recommendation module 524 can be implemented with the first control unit 312 of FIG. 3, the first storage interface 324 of FIG. 3, the first software 326 of FIG. 3, or a combination thereof. For a more specific example, the assess recommendation module 524 can generating the initial recommendation 526 with the first control unit 312, the first storage interface 324, and the first software 326.

The select recommendation module 523 can include a substitute recommendation module 528 providing or generating a different recommendation 530 if the search entry 516 cannot be found or the search entry 516 is not located at the point of interest 214. The different recommendation 530 can be selected based on a list of pre-defined selections. The different recommendation 530 can also be selected by partially parsing the search entry 516.

The different recommendation 530 is an option that is not the same as but similar to the search entry 516 and is located at the point of interest 214. The different recommendation 530 can be determined by selecting an entry from the notification source 408.

For example, the different recommendation 530 can include an alternative product. Also for example, the different recommendation 530 can include a different product that is substantially the same or better than the search entry 516. Further, for example, the different recommendation 530 can be better than the inquired product in terms of providing a cost saving, an enhanced quality, an improved service, an ease of use, or any characteristic that provides a benefit to the user compared to the inquired product.

For a more specific example, the different recommendation 530 can be an item that is not the same name brand as a brand of the search entry 516. Also for a more specific example, the different recommendation 530 can be an item that can be purchased, a service that can be provided, or an event that can be attended.

The different recommendation 530 can include a predetermined entry based on the user profile 510. For example, if the user profile 510 indicates that a user performing a search for ice cream is a diabetic, the substitute recommendation module 528 determines the different recommendation 530 as "sugar-free yogurt". Also for example, if the user profile 510 indicates that a user performing a search for ice cream has a low blood sugar level, the substitute recommendation module 528 determines the different recommendation 530 as "ice cream".

The substitute recommendation module 528 can be implemented with the first device 102 of FIG. 1. For example, the substitute recommendation module 528 can be implemented with the first control unit 312 of FIG. 3, the first storage interface 324 of FIG. 3, the first software 326 of FIG. 3, or a combination thereof. For a more specific example, the substitute recommendation module 528 can generate the different recommendation 530 with the first control unit 312, the first storage interface 324, and the first software 326.

The select recommendation module 523 can include a read position module 532 to read and store a recommendation location 534 at the point of interest 214 where the initial recommendation 526 or the different recommendation 530 is located. The recommendation location 534 can be received from the notification source 408. The recommendation location 534 can be at the point of interest 214. For example, the recommendation location 534 can be a location of a store.

The read position module 532 can be implemented with the first device 102 of FIG. 1. For example, the read position module 532 can be implemented with the first control unit 312 of FIG. 3, the first storage interface 324 of FIG. 3, the first software 326 of FIG. 3, or a combination thereof. For a more specific example, the read position module 532 can read the recommendation location 534 with the first control unit 312, the first storage interface 324, and the first software 326.

The select recommendation module 523 can include a read time module 536 to read and store a recommendation available time 538 from the notification source 408 when the initial recommendation 526 or the different recommendation 530 exists at the point of interest 214. The recommendation available time 538 can be predetermined indicating availability of the initial recommendation 526 or the different recommendation 530.

For example, the recommendation available time 538 can include a calendar date, a day of the week, a time of the day, or a combination thereof. For example, the recommendation available time 538 can be recorded or stored by the first storage unit 314 of FIG. 3 or the second storage unit 346 of FIG. 3.

The read time module 536 can be implemented with the first device 102 of FIG. 1. For example, the read time module 536 can be implemented with the first control unit 312 of FIG. 3, the first storage interface 324 of FIG. 3, the first software 326 of FIG. 3, or a combination thereof. For a more specific example, the read time module 536 can read the recommendation available time 538 with the first control unit 312, the first storage interface 324, and the first software 326.

The select recommendation module 523 can include an adjust cost module 540 providing an acquisition cost 542 for the initial recommendation 526 or the different recommendation 530. The acquisition cost 542 is a quantity or a value that is calculated for the initial recommendation 526 or the different recommendation 530 based on pre-defined adjustment conditions, such as a pre-determined percentage, the recommendation location 534, or the recommendation available time 538. For example, the acquisition cost 542 can be an assigned numerical value of a sponsored price associated with a product or a service.

For example, the acquisition cost 542 can be determined with a pre-defined table or list of numerical values. Also for example, the acquisition cost 542 can be determined with a pre-determined calculation, equation, or mathematical function.

The acquisition cost 542 can be dynamically determined. The acquisition cost 542 can be pre-selected to match a numerical value of the search acquisition cost 518 with the numerical value determined at the time when the user performs the search. For example, the acquisition cost 542 can be a dynamic pricing.

The acquisition cost 542 can be calculated to be approximately the search acquisition cost 518. The acquisition cost 542 can be pre-determined to be a numerical value approximately equal to a fixed percentage of the search acquisition cost 518. For example, the acquisition cost 542 can be less than or greater than the search acquisition cost 518.

The acquisition cost 542 can be calculated based on the recommendation location 534 and a distance threshold 544. The distance threshold 544 is a predetermined numerical value to which the recommendation location 534 is compared at the time when the acquisition cost 542 is calculated.

For example, the acquisition cost 542 can be calculated to be a numerical value that is a fixed percentage of the search acquisition cost 518 and is lower than the search acquisition cost 518 if an estimated distance from the current location 212 of FIG. 2 to the recommendation location 534 is above the distance threshold 544. Also for example, the acquisition cost 542 can be calculated to be a numerical value that is a fixed percentage of the search acquisition cost 518 and is higher than the search acquisition cost 518 if an estimated distance from the current location 212 to the recommendation location 534 is below the distance threshold 544 thereby providing a location benefit.

The acquisition cost 542 can be calculated based on the recommendation available time 538 and a time threshold 546. The time threshold 546 is a predetermined numerical value to which the recommendation available time 538 is compared at the time when the acquisition cost 542 is calculated.

For example, the acquisition cost 542 can be calculated to be a numerical value that is a fixed percentage of the search acquisition cost 518 and is lower than the search acquisition cost 518 if an estimated time taken to travel from the current location 212 to the recommendation location 534 is above the time threshold 546. Also for example, the acquisition cost 542 can be calculated to be a numerical value that is a fixed percentage of the search acquisition cost 518 and is higher than the search acquisition cost 518 if an estimated time taken to travel from the current location 212 to the recommendation location 534 is below the time threshold 546.

The acquisition cost 542 can be calculated as a numerical value greater than or equal to a minimum acquisition cost 548. The minimum acquisition cost 548 is a lowest numerical value that the acquisition cost 542 can be. For example, the acquisition cost 542 is calculated as a numerical value equal to the minimum acquisition cost 548 if the search acquisition cost 518 is below the minimum acquisition cost 548.

The distance threshold 544, the time threshold 546, the minimum acquisition cost 548, or a combination thereof can be pre-determined based on a calendar day, a day of the week, a time of the day, or a combination thereof. For example, when the acquisition cost 542 is calculated on a holiday, the minimum acquisition cost 548 can be a numerical value higher than a numerical value of another of the minimum acquisition cost 548 when another of the acquisition cost 542 is calculated on a non-holiday.

The acquisition cost 542 can be calculated or predicted based on a visit threshold 550 and the historical data 410 including a recorded number of times a user performing a search frequently visits the recommendation location 534. The visit threshold 550 is a pre-defined numerical value to which the historical data 410 is compared.

For example, the acquisition cost 542 can be calculated to be a numerical value that is a fixed percentage of the search acquisition cost 518 and is lower than the search acquisition cost 518 if the recorded number is less than the visit threshold 550. Also for example, the acquisition cost 542 can be calculated to be a numerical value that is a fixed percentage of the search acquisition cost 518 and is higher than the search acquisition cost 518 if the recorded number is greater than or equal to the visit threshold 550.

The acquisition cost 542 can be calculated by comparing the recommendation location 534 to the search location 520. For example, the acquisition cost 542 can be calculated to be a numerical value that is a fixed percentage of the search acquisition cost 518 and is lower than the search acquisition cost 518 if an estimated distance from the current position to the recommendation location 534 is greater than or equal to an estimated distance from the current location 212 to the search location 520. In other words, the recommendation location 534 is farther from the current position than the search location 520 in this example.

Also for example, the acquisition cost 542 can be calculated to be a numerical value that is a fixed percentage of the search acquisition cost 518 and is the same or higher than the search acquisition cost 518 if an estimated distance from the current position to the recommendation location 534 is less than an estimated distance from the current location 212 to the search location 520. In other words, the recommendation location 534 is closer from the current position than the search location 520 in this example. In this latter example, the user can get the initial recommendation 526 or the different recommendation 530 at the recommendation location 534 instead of ordering online thereby providing an in-store benefit.

For example, the acquisition cost 542 can be calculated to be a numerical value that is a fixed percentage of the search acquisition cost 518 and is higher than the search acquisition cost 518 providing an in-store benefit. In this example, the user can get the initial recommendation 526 or the different recommendation 530 from a local store instead of ordering online. For example, a store may offer the product, such as the initial recommendation 526 or the different recommendation 530, at a given price, such as the acquisition cost 542, two days later in the store as opposed to on-line only.

The acquisition cost 542 can be calculated by comparing the recommendation available time 538 to the search available time 522. For example, the acquisition cost 542 can be calculated to be a numerical value that is a fixed percentage of the search acquisition cost 518 and is lower than the search acquisition cost 518 if the recommendation available time 538 is greater than or equal to the search available time 522. Also for example, the acquisition cost 542 can be calculated to be a numerical value that is a fixed percentage of the search acquisition cost 518 and is higher than the search acquisition cost 518 if the recommendation available time 538 is less than the search available time 522 providing a time benefit.

The adjust cost module 540 can be implemented with the first device 102 of FIG. 1. For example, the adjust cost module 540 can be implemented with the first control unit 312 of FIG. 3, the first storage interface 324 of FIG. 3, the first software 326 of FIG. 3, or a combination thereof. For a more specific example, the adjust cost module 540 can calculate the acquisition cost 542 with the first control unit 312, the first storage interface 324, and the first software 326.

The process recommendation module 404 can include a generate message module 552 to generate the message 218 of FIG. 2 for the initial recommendation 526 or the different recommendation 530 to the point of interest 214. The message 218 can be generated to include the background information 506, the initial recommendation 526, the different recommendation 530, the recommendation location 534, the recommendation available time 538, the acquisition cost 542, or a combination thereof. The generate message module 552 can be coupled to the select recommendation module 523.

The generate message module 552 can be implemented with the first device 102 of FIG. 1. For example, the generate message module 552 can be implemented with the first control unit 312 of FIG. 3, the first storage interface 324 of FIG. 3, the first software 326 of FIG. 3, or a combination thereof. For a more specific example, the generate message module 552 can generating the message 218 with the first control unit 312, the first storage interface 324, and the first software 326.

For example, the initial recommendation 526 or the different recommendation 530 can be a product or a service offered by a sponsored entity for which the message 218 is to be presented. Also for example, the message 218 is presented can be an advertisement of a sponsored company provided by the notification source 408.

For example, the search entry 516, the initial recommendation 526, or the different recommendation 530 can be a product or a service offered at a sponsored company. Also for example, the search acquisition cost 518 or the acquisition cost 542 can be a sponsored price of a product or service.

It has been discovered that the message 218 presented with the acquisition cost 542, for the initial recommendation 526 related to the point of interest 214 upcoming along the navigation route 206, provides an effective purchase criteria to the user. These purchase criteria are provided in real-time information based on the search acquisition cost 518, the recommendation location 534, or the recommendation available time 538 to dynamically calculate the acquisition cost 542 to provide information to the user to make a purchase decision including the initial recommendation 526 or the different recommendation 530 along the navigation route 206. The benefit to the user includes making a purchase decision based on tradeoff between cost, location, and time.

The physical transformation of data of the message 218 results in movement in the physical world, such as people using the first device 102 of FIG. 1, the navigation system 100, or vehicles, to visit the recommendation location 534 along the navigation route 206 based on the operation of the navigation system 100. As the movement in the physical world occurs, the movement itself creates additional information that is converted back to the data for further processing with the recommendation location 534 for the continued operation of the navigation system 100 and to continue the movement in the physical world.

Thus, it has been discovered that the navigation system 100 of the present invention furnishes important and heretofore unknown and unavailable solutions, capabilities, and functional aspects for providing a user-friendly experience and increasing safety.

The navigation system 100 describes the module functions or order as an example. The modules can be partitioned differently. For example, the plan module 402 and the presentation module 412 can be grouped or implemented in a single module. Each of the modules can operate individually and independently of the other modules.

Figure 6:
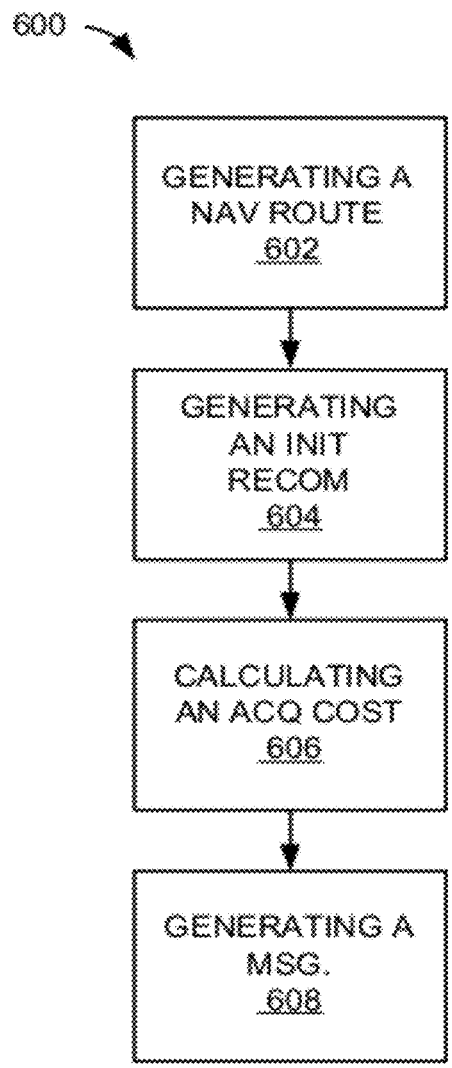
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: generating a navigation route in a block 602; generating an initial recommendation related to a search keyword for a point of interest upcoming along the navigation route in a block 604; calculating an acquisition cost for the initial recommendation in a block 606; and generating a message with the acquisition cost for the initial recommendation related to the point of interest and for displaying on a device in a block 608.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    generating a navigation route;
    generating an initial recommendation related to a search keyword for a point of interest upcoming along the navigation route;
    calculating, with a control unit, an acquisition cost for the initial recommendation; and
    generating a message with the acquisition cost for the initial recommendation related to the point of interest and for displaying on a device.

2. The method as claimed in claim 1 further comprising:
    extracting a search acquisition cost from the search keyword; and
    wherein calculating the acquisition cost includes:
        calculating the acquisition cost less than the search acquisition cost.

3. The method as claimed in claim 1 further comprising:
    extracting a search available time from the search keyword;
    reading a recommendation available time for the initial recommendation; and
    wherein calculating the acquisition cost includes:
        calculating the acquisition cost with the recommendation available time greater than the search available time.

4. The method as claimed in claim 1 further comprising:
    extracting a search location from the search keyword;
    reading a recommendation location for the initial recommendation; and
    wherein calculating the acquisition cost includes:
        calculating the acquisition cost with the recommendation location farther than the search location.

5. The method as claimed in claim 1 further comprising:
    extracting a search entry from the search keyword; and
    generating a different recommendation with the search entry not located at the point of interest.

6. A method of operation of a navigation system comprising:
    recording historical data;
    generating a navigation route;
    generating an initial recommendation related to a search keyword for a point of interest upcoming along the navigation route;
    calculating, with a control unit, an acquisition cost for the initial recommendation based on the historical data; and
    generating a message for the initial recommendation to the point of interest with the acquisition cost for displaying on a device.

7. The method as claimed in claim 6 further comprising:
    extracting a search acquisition cost from the search keyword; and
    wherein calculating the acquisition cost includes:
        calculating the acquisition cost greater than the search acquisition cost.

8. The method as claimed in claim 6 further comprising:
    extracting a search available time from the search keyword;
    reading a recommendation available time for the initial recommendation; and
    wherein calculating the acquisition cost includes:
        calculating the acquisition cost with the recommendation available time less than the search available time.

9. The method as claimed in claim 6 further comprising:
    extracting a search location from the search keyword;
    reading a recommendation location for the initial recommendation; and
    wherein calculating the acquisition cost includes:
        calculating the acquisition cost with the recommendation location closer than the search location.

10. The method as claimed in claim 6 further comprising:
    extracting a search entry from the search keyword; and
    generating a different recommendation with the search entry not located at the point of interest, the different recommendation similar to the search entry.

11. A navigation system comprising:
    a storage unit implementing:
        a plan module for generating a navigation route;
        an assess recommendation module, coupled to the plan module, for generating an initial recommendation related to a search keyword for a point of interest upcoming along the navigation route;
    a control unit implementing:
        an adjust cost module, coupled to the assess recommendation module, for calculating an acquisition cost for the initial recommendation; and
        a generate message module, coupled to the adjust cost module, for generating a message with the acquisition cost for the initial recommendation related to the point of interest and for displaying on a device.

12. The system as claimed in claim 11 further comprising:
    a receive keyword module, coupled to the plan module, for extracting a search acquisition cost from the search keyword; and
    wherein:
        the adjust cost module is for calculating the acquisition cost less than the search acquisition cost.

13. The system as claimed in claim 11 further comprising:
    a receive keyword module, coupled to the plan module, for extracting a search available time from the search keyword;
    a read time module, coupled to the receive keyword module, for reading a recommendation available time for the initial recommendation; and
    wherein:
        the adjust cost module is for calculating the acquisition cost with the recommendation available time greater than the search available time.

14. The system as claimed in claim 11 further comprising:
    a receive keyword module, coupled to the plan module, for extracting a search location from the search keyword;
    a read position module, coupled to the receive keyword module, for reading a recommendation location for the initial recommendation; and
    wherein:
        the adjust cost module is for calculating the acquisition cost with the recommendation location farther than the search location.

15. The system as claimed in claim 11 further comprising:
    a receive keyword module, coupled to the plan module, for extracting a search entry from the search keyword; and
    a substitute recommendation module, coupled to the receive keyword module, for generating a different recommendation with the search entry not located at the point of interest.

16. The system as claimed in claim 11 further comprising:
a collect data module, coupled to the plan module, for recording historical data; and wherein:
the adjust cost module is for calculating the acquisition cost for the initial recommendation based on the historical data.

17. The system as claimed in claim 16 further comprising:
a receive keyword module, coupled to the plan module, for extracting a search acquisition cost from the search keyword; and wherein:
the adjust cost module is for calculating the acquisition cost greater than the search acquisition cost.

18. The system as claimed in claim 16 further comprising:
a receive keyword module, coupled to the plan module, for extracting a search available time from the search keyword;
a read time module, coupled to the receive keyword module, for reading a recommendation available time for the initial recommendation; and wherein:
the adjust cost module is for calculating the acquisition cost with the recommendation available time less than the search available time.

19. The system as claimed in claim 16 further comprising:
a receive keyword module, coupled to the plan module, for extracting a search location from the search keyword;
a read position module, coupled to the receive keyword module, for reading a recommendation location for the initial recommendation; and wherein:
the adjust cost module is for calculating the acquisition cost with the recommendation location closer than the search location.

20. The system as claimed in claim 16 further comprising:
a receive keyword module, coupled to the plan module, for extracting a search entry from the search keyword; and
a substitute recommendation module, coupled to the receive keyword module, for generating a different recommendation with the search entry not located at the point of interest, the different recommendation similar to the search entry.

* * * * *